Oct. 24, 1939.   J. JULIOT   2,177,570
HARROW
Filed March 9, 1939   3 Sheets-Sheet 3
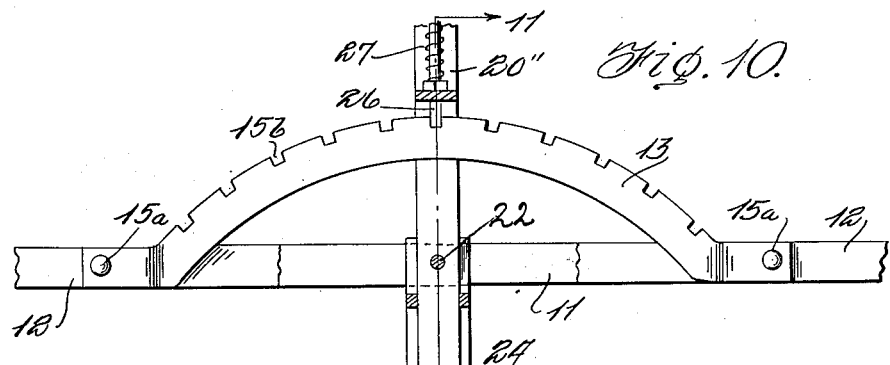
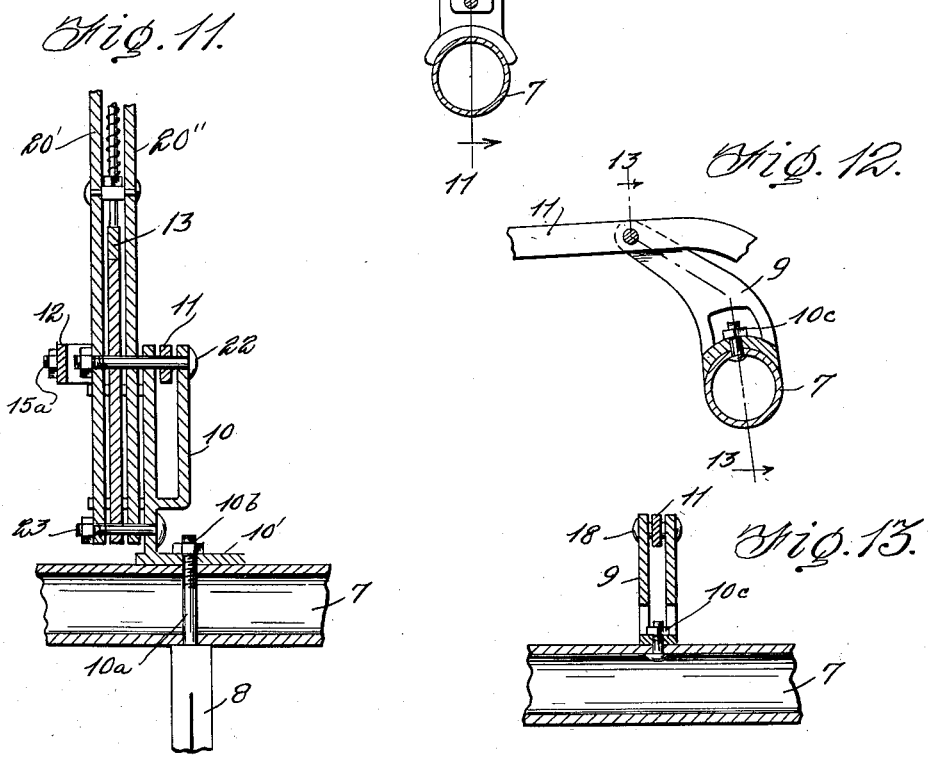
Inventor,
Joseph Juliot,
By Frank S. Appleman,
Attorney.

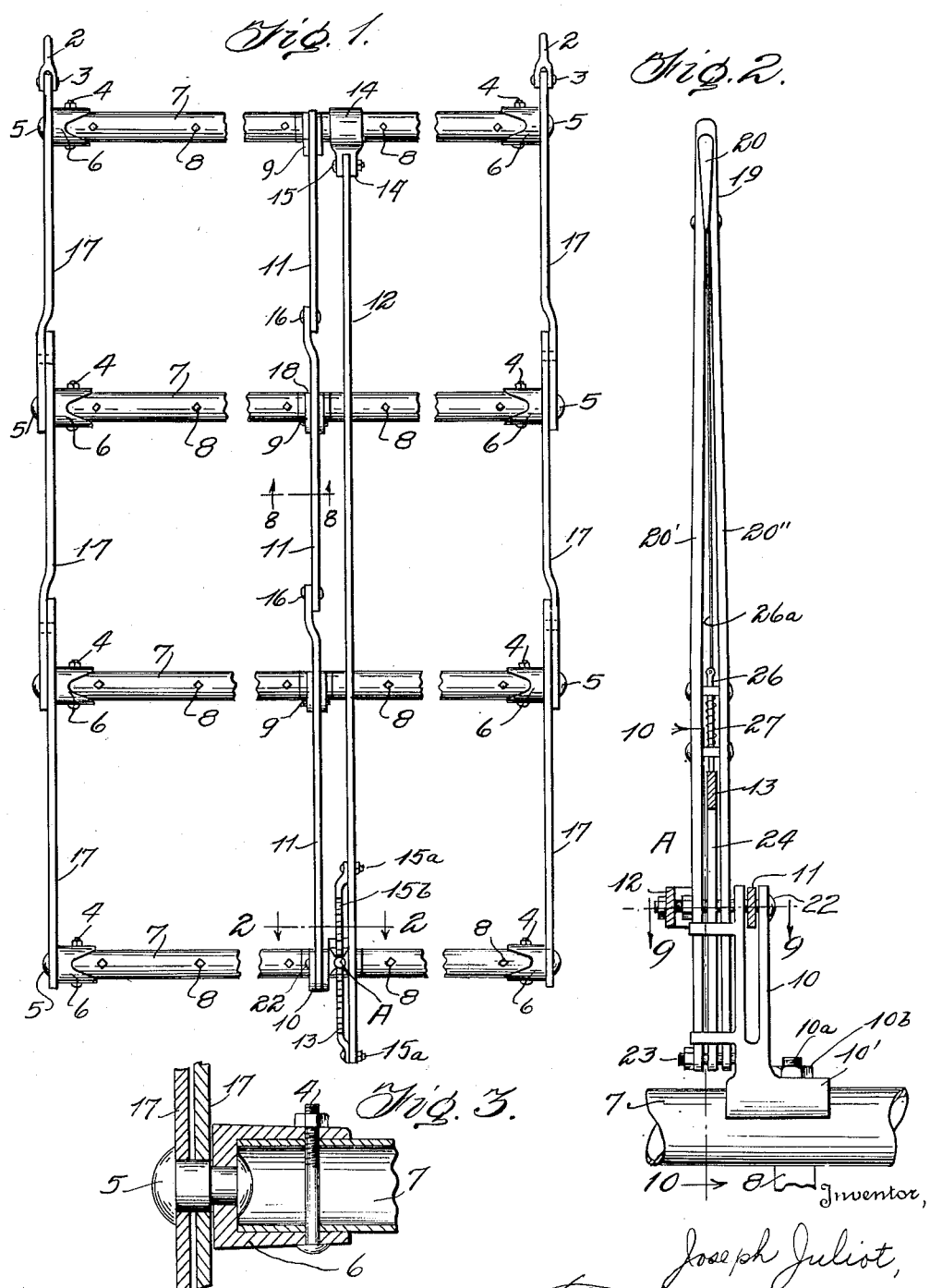

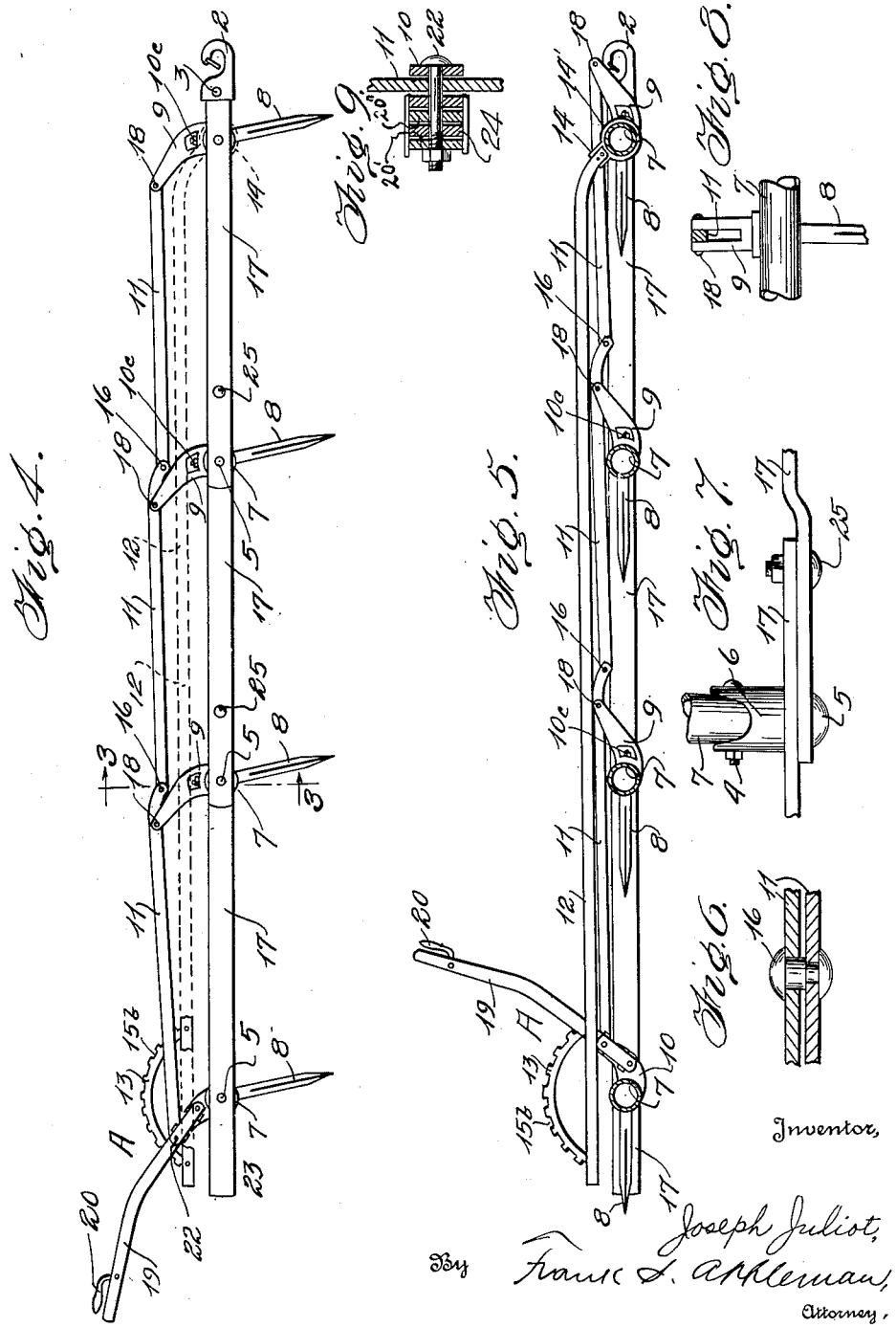

Patented Oct. 24, 1939

2,177,570

UNITED STATES PATENT OFFICE 2,177,570

HARROW

Joseph Juliot, Pepin, Wis., assignor to Northern Wisconsin Manufacturing Co., Pepin, Wis., a corporation of Wisconsin Application March 9, 1939, Serial No. 260,871

5 Claims. (Cl. 55—103)

This invention relates to agricultural implements, and particularly to harrows.

An object of the invention is to produce a sectional harrow in which the sections are respectively oscillatable in order that the said sections will adapt themselves to uneven contours of the surface being cultivated or treated, novel means being provided by which the sections may be held rigid when desired, so that the sections may be held against oscillatory movement, resulting in a rigid harrow instead of the flexible harrow just mentioned.

An object of the invention furthermore is to provide means whereby the sections of the harrow carrying the teeth or tooth bars may partially rotate in order that the angle of the said teeth with respect to the surface of the soil being treated may be changed to suit particular requirements, and in order furthermore that the said teeth may be swung to inoperative positions to facilitate the movement of the harrow when being transported and when not in operation.

It is a further object of the invention to provide novel means operated by a handle for communicating motion to the parts carrying the teeth for moving the teeth carrying members in unison, or for retaining them in their several adjusted positions; and furthermore it is an object to provide a harrow of the character indicated which will be strong and durable, as well as efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of a harrow embodying the invention;

Figure 2 illustrates a sectional view on the line 2—2 of Fig. 1;

Figure 3 illustrates a detail section on the line 3—3 of Fig. 4;

Figure 4 illustrates a view in side elevation with the harrow teeth in operative position;

Figure 5 illustrates a view in side elevation with the harrow teeth collapsed or inoperative;

Figure 6 illustrates a sectional view of the joint between the oscillatable sections;

Figure 7 illustrates a plan view of a fragment of the oscillatable sections secured together to provide a rigid harrow;

Figure 8 illustrates a sectional view on the line 8—8 of Fig. 1;

Figure 9 illustrates a sectional view on the line 9—9 of Fig. 2;

Figure 10 illustrates a fragmentary detail showing the adjusting lever and associated parts;

Figure 11 illustrates a detail section on the line 11—11 of Fig. 10;

Figure 12 illustrates an enlarged fragmentary view showing a rocker arm and associated parts as used herein; and Figure 13 illustrates a section on the line 13—13 of Fig. 12.

In the present embodiment of the invention, a plurality of sections are illustrated, and the forward or draft section may be provided with the usual draft hook 2 secured by the pivots 3 to the harrow frame. The structure also includes means, such as the bolts 4, rivets 5, sockets 6 and tooth bars 7, which are used to assemble the tooth bars on the side members or links, as will presently appear. The harrow teeth 8 are fastened to the tooth bars 7 in appropriate manner and each bar 7 is provided with a standard 9, except for the one of the rear of the harrow which has a standard 10, to which a handle is connected, as will presently appear. The standard assembly and operating lever and parts associated therewith are located and generally identified by the letter A in Fig. 1 where the scale of the drawings will not permit the details to be illustrated, but the handle and the operating parts are mounted on the rear tooth bar of the harrow. The tooth bars are moved by links or adjusting bars 11 pivotally connected to the standards 9. The standard 10 has a base 10' attached to the rear tooth bar by a shank 10ª extending through the rear tooth bar and said base and secured in place by a nut 10ᵇ. The shank 10ª is an extension of the harrow tooth 8 and all of the harrow teeth are secured to their respective tooth bars in similar manner. The several standards 9 are secured to the respective tooth bars by fastenings such as 10ᶜ and the links 11 are pivoted to the upper ends of said standards.

A bar 12 extends from the front to the rear of the harrow and at the rear end a quadrant 13 is attached to the said bar 12. The front end of the bar 12 is connected to the front tooth bar 7 by means of an arm 14 having a sleeve 14' which permits rotation of the tooth bar 7, and the arm 14 is connected to the bar 12 by a bolt 15. The quadrant 13 is mounted on the bar 12 by means of rivets 15ᵃ and the quadrant is provided with recesses or notches 15ᵇ in its upper surface.

The links or bars 11 have their contiguous ends connected by a pivot 16 and between their ends they are oscillatably mounted on the standards 9, which standards, as stated, are mounted on the tooth bar 7. The side members 17 overlap at their ends and the overlapping members are oscillatively mounted on a rivet 5 which holds the assembly of the tooth bar in operative relation to the side members 17.

The end tooth bars have a similar rivet extending through the relative end bars and these afford oscillatory movement of the side bars and rotative movement of the tooth bar. Bolts 18 are employed to pivotally connect the sectional bars 11 to the standards 9 and through the movement of these sectional bars 11 the tooth bars are moved from the position in which the teeth are shown in Fig. 4 to the position in which they are shown in Fig. 5 and vice versa. The handle 19 for operating the tooth bars in the manner stated comprises two parallel flat rods 20', 20'', between which at the upper end a latch operating lever 20 is pivoted, the said lever 20 operating a detent which coacts with the quadrant 13, as will presently appear.

The standard 10 has a pivot 22 and a bolt 23 on which the handle 19 is secured. Between the sections of the handle and secured between the members of the handle on the pivot 22 and bolt 23 is a strip of iron 24 which acts as a prop or brace for the quadrant and it is shown as terminating at the under surface of the said quadrant, and this brace rides between the sections of the lever 19 as said handle is oscillated. The rear end of the sectional bar 11 has an aperture to receive the pivot 22 so that as the standard is moved under the influence of the handle, it reciprocates the rear sectional bar and it in turn communicates motion successively to the other sectional bars 11 and to the front tooth bar. At the same time, when the handle is oscillated, the connection of the handle with the standard and the connection of the standard with the rear tooth bar turns the rear tooth bar proportional to the movement of the other tooth bars which are moved under the influence of the connecting bars 11.

It is seen from an inspection of the drawings that the overlapping portions of the side members 17 may be held from oscillating, one with respect to the other, by the bolts 25 extending through the overlapping portions of these side members and with this arrangement the side members 17 cannot oscillate independently of each other, and hence, instead of there being a flexible harrow or harrow sections which move independently, one of the other, a rigid harrow frame results.

The lever 20 is connected to a retaining bolt 26 by a rod or wire 26ᵃ and the said bolt is forced downwardly by a spring 27 so that when the lever 20 is released, the lower end of the bolt enters a notch 15ᵇ of the quadrant and the parts are thereby held at different positions of adjustment.

As seen from an inspection of the drawings, the bar 12 is a rigid bar extending from the front tooth bar to the rear and it overlies the rear tooth bar. The quadrant is located on the bar 12 and secured thereto so that it extends across the rear tooth bar. The standard and the lever are, through the connections heretofore described, rigid with the rear tooth bar so that when the lever is oscillated, it partially rotates the rear tooth bar. The quadrant 13 being attached to the bar 12 and being embraced by the two members 20' and 20'' of the handle is stationary while the handle is being oscillated and the handle is held in different positions of adjustment by reason of the detent of the handle engaging the notches of the quadrant.

The tooth bars may be held at different positions of adjustment in the manner stated and, as in Fig. 5, when the handle is thrust forwardly, the tooth bars will be adjusted so that they are parallel with the line of movement of the harrow and of course are then inoperative but, as in Fig. 4, the adjustment is such that the teeth are operative and they may be adjusted to different angles with relation to the side members 17.

I claim:

1. A harrow comprising flexible side members, means for rendering the side members inflexible, tooth bars having extensions forming pivots for the side members and trunnions for partial rotation of the said tooth bars, a standard attached to the rear tooth bar, a lever attached to the standard and operative to partially turn the tooth bar, means for communicating the motion of the lever to the several tooth bars for partially rotating them, a rigid member extending longitudinally of the harrow, a sleeve in which the front tooth bar is rotatable including means for connecting the sleeve to the rigid member, a quadrant attached to the rigid member near its rear end with relation to which the lever is operative, and means on the lever engaging the quadrant for holding the lever at different positions of adjustment.

2. A harrow comprising flexible side members, means for rendering the side members inflexible, tooth bars having extensions forming pivots for the side members and trunnions for partial rotation of the said tooth bars, a standard attached to the rear tooth bar, a lever attached to the standard and operative to partially turn the tooth bar, means for communicating the motion of the lever to the several tooth bars for partially rotating them, a rigid member extending longitudinally of the harrow, a sleeve in which the front tooth bar is rotatable including means for connecting the sleeve to the rigid member, a quadrant attached to the rigid member near its rear end with relation to which the lever is operative, means on the lever engaging the quadrant for holding the lever at different positions of adjustment, and a brace movable with the lever under the quadrant and in engagement therewith for stabilizing the structure.

3. A harrow comprising flexible side members, tooth bars having extensions forming pivots for the side members and trunnions for partial rotation of the said tooth bars, a standard attached to the rear tooth bar, a lever attached to the standard and operative to partially turn the tooth bar, means for communicating the motion of the lever to the several tooth bars for partially rotating them, a rigid member extending longitudinally of the harrow, a sleeve in which the front tooth bar is rotatable including means for connecting the sleeve to the rigid member, a quadrant attached to the rigid member near its rear end with relation to which the lever is operative, and means on the lever engaging the quadrant for holding the lever at different positions of adjustment.

4. A harrow comprising flexible side members, means for rendering the side members inflexible, tooth bars having extensions forming pivots for the side members and trunnions for partial rotation of the said tooth bars, a standard attached to the rear tooth bar, a lever attached to the standard and operative to partially turn the tooth bar, a plurality of links extending longitudinally of the harrow and having their ends pivotally connected, means for connecting the said links respectively to a tooth bar whereby the movement of each link oscillates a bar, means for connecting the rear of the series of links to the standard whereby the tooth bars are oscillated in unison, a rigid member extending longitudinally of the harrow, a sleeve in which the front tooth bar is rotatable including means for connecting the sleeve to the rigid member, a quadrant attached to the rigid member near its rear end with relation to which the lever is operative, and means on the lever engaging the quadrant for holding the lever at different positions of adjustment.

5. A harrow comprising flexible side members, means for rendering the side members inflexible, tooth bars, a socket attached to each end of each tooth bar, each of said sockets having a projection extending through the adjacent side members on which said side members are pivoted and said extensions also forming trunnions for the partial rotation of said tooth bars with relation to the side members, a standard attached to the rear tooth bar, a lever attached to the standard and operative to partially turn the tooth bar, means for communicating the motion of the lever to the several tooth bars for partially rotating them, a rigid member extending longitudinally of the harrow, a sleeve in which the front tooth bar is rotatable including means for connecting the sleeve to the rigid member, a quadrant attached to the rigid member near its rear end with relation to which the lever is operative, and means on the lever engaging the quadrant for holding the lever at different positions of adjustment.

JOSEPH JULIOT.